(12) United States Patent
Wang

(10) Patent No.: US 8,006,876 B2
(45) Date of Patent: Aug. 30, 2011

(54) SECURING DEVICE FOR CONNECTING BICYCLE RACK TO VEHICLE

(76) Inventor: Chiu-Kuei Wang, Dajia Town (TW)

(*) Notice: Subject to any disclaimer, the term of this patent is extended or adjusted under 35 U.S.C. 154(b) by 748 days.

(21) Appl. No.: 12/153,905

(22) Filed: May 28, 2008

(65) Prior Publication Data

US 2008/0303244 A1    Dec. 11, 2008

(30) Foreign Application Priority Data

Jun. 11, 2007   (GB) .................................. 0711232.9

(51) Int. Cl.
*B60R 9/06* (2006.01)
(52) U.S. Cl. ......... 224/520; 224/924; 224/555; 224/558
(58) Field of Classification Search .................. 224/520, 224/555, 558, 924; 248/481–482, 288.31, 248/288.51, 181.1; 269/109, 191; 403/141–143, 403/122, 90; 280/511–512; 70/209–210, 70/215–217
See application file for complete search history.

(56) References Cited

U.S. PATENT DOCUMENTS

| 687,347 | A | * | 11/1901 | Stapleton | 248/181.1 |
|---|---|---|---|---|---|
| 918,717 | A | * | 4/1909 | Wemple | 403/141 |
| 1,061,325 | A | * | 5/1913 | Reinartz | 248/288.51 |
| 2,874,976 | A | * | 2/1959 | Linn | 280/512 |
| 3,691,788 | A | * | 9/1972 | Mazziotti | 464/139 |
| 3,858,775 | A | * | 1/1975 | Haas | 224/520 |
| 3,862,728 | A | * | 1/1975 | Miller | 242/476.7 |
| 4,176,853 | A | * | 12/1979 | Brock | 280/423.1 |
| 4,576,395 | A | * | 3/1986 | Longoria | 280/511 |
| 4,901,896 | A | * | 2/1990 | Speer | 224/520 |
| 4,993,739 | A | * | 2/1991 | Putnam | 280/511 |
| 5,121,862 | A | * | 6/1992 | Schmidt | 224/520 |
| 5,228,607 | A | * | 7/1993 | Tolsdorf | 224/520 |
| 5,236,110 | A | * | 8/1993 | Schmidt | 224/517 |
| 5,588,574 | A | * | 12/1996 | Schmidt | 224/520 |
| 5,803,642 | A | * | 9/1998 | Sassmannshausen | 403/90 |
| 5,813,789 | A | * | 9/1998 | Prickler et al. | 403/135 |
| 6,234,961 | B1 | * | 5/2001 | Gray | 600/234 |
| 6,827,318 | B1 | * | 12/2004 | Hsu Li | 248/160 |
| 6,971,565 | B2 | * | 12/2005 | Wang | 224/497 |

* cited by examiner

*Primary Examiner* — Justin M Larson
*Assistant Examiner* — John Cogill

(57) ABSTRACT

A connection device for connecting a bicycle rack to a connection member on a vehicle includes a clamping unit composed of four quarters and a mounting member is mounted onto the four quarters withinhich the connection member is enclosed. A bolt's head is clamped by four respective protrusions on the four quarters and the shank extends through the top of the clamping unit and the mounting member so as to be connected with a knob. A lock is received in the knob and cooperated with the bolt. The mounting member has a T-shaped slot and two lugs extend from the mounting member. The vertical slot is located between the two lugs and a quick release unit is cooperated with the two lugs so as to control the distance between the two lugs. By using the quick release unit, the four quarters can quickly release the connection member.

7 Claims, 13 Drawing Sheets

SECURING DEVICE FOR CONNECTING BICYCLE RACK TO VEHICLE

FIELD OF THE INVENTION

The present invention relates to a securing device for connecting a bicycle rack to rear end of a vehicle and the securing device includes a quick release unit to quick release the securing device.

BACKGROUND OF THE INVENTION

A conventional bicycle rack 8 is shown in FIGS. 12A and 12B, and generally includes a connection device which is used to be connected with a sphere 70 fixed on a rear end of a vehicle which is not shown. The connection device includes a substantially C-shaped frame 82 including an open end and a slot 811 is defined in a bottom board 81 thereof. A U-shaped flange 812 extends from a top of the bottom bard 81 and encloses the slot 711. The sphere 70 is inserted from the open end and located within the slot 811 rested on the flange 812. A hole is defined through a top of the C-shaped frame 82 and a nut 821 is fixed to the top of the C-shaped frame 82, the hole communicates with the threaded hole in the nut 821. A threaded shank 83 threadedly extends through the nut 821 and the hole so as to press on the sphere 70.

However, the threaded shank 83 is easily loosened by the shaking during riding of the vehicle and once the threaded shank 83 does not well position the sphere 70, the bicycle rack could be separated from the sphere 70. Besides, the threaded shank 83 is exposed without any protection and any one can easily unscrew the threaded shank 83 to remove the bicycle rack together with the bicycles on the bicycle rack.

The present invention intends to provide a securing device which includes a knob threadedly connected to a bolt on a clamping unit which clamps the connection member/sphere of the vehicle, and a lock is used to connect the knob to the rack.

Besides, a quick release unit is used to allow the user to release the sphere from the securing device conveniently and quickly.

SUMMARY OF THE INVENTION

The present invention relates to a securing device for connecting a bicycle rack to a connection member on a vehicle, the securing device comprises a clamping unit which is composed of four quarters and each quarter has a protrusion on a top thereof. The connection member is accommodated within a room enclosed by the four quarters. A notch is defined in an inner side of each of the protrusion and a space composed of the four notches of the four quarters receives the head of the shank which extends through the top of the clamping unit. A mounting member is mounted to the clamping unit and has a through hole defined through a top thereof. The shank of the bolt extends through the through hole. An extension is connected to the mounting member and connected with the bicycle rack. A nut is threadedly connected to the shank. A knob has an inner threaded recess which is threadedly connected to the shank and presses on the top of the mounting member. A lock is located in the knob and cooperated with the shank of the bolt.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
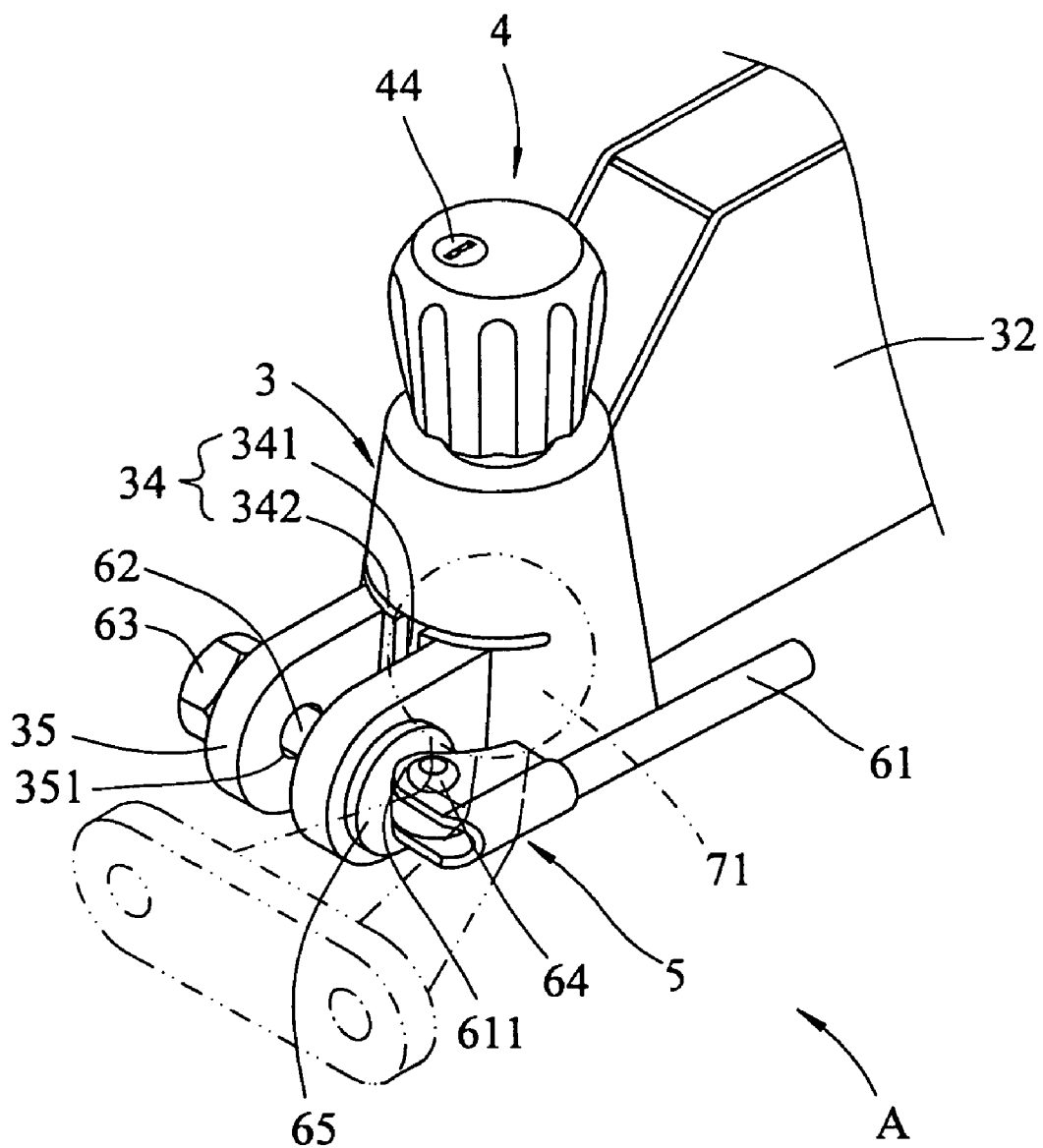
FIG. 1 is a perspective view to show the securing device of the present invention.
Figure 2:
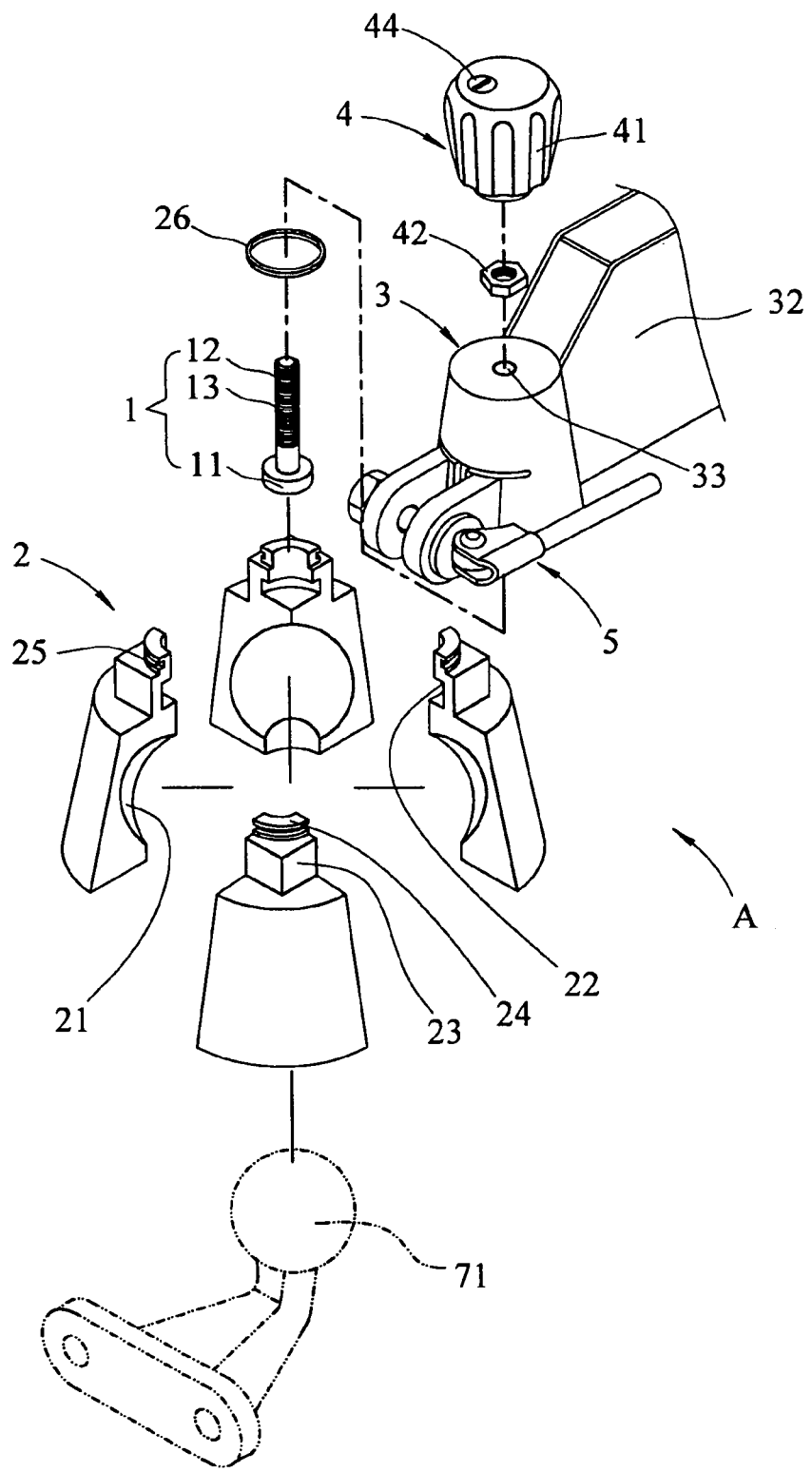
FIG. 2 is an exploded view to show the securing device of the present invention.
Figure 3:
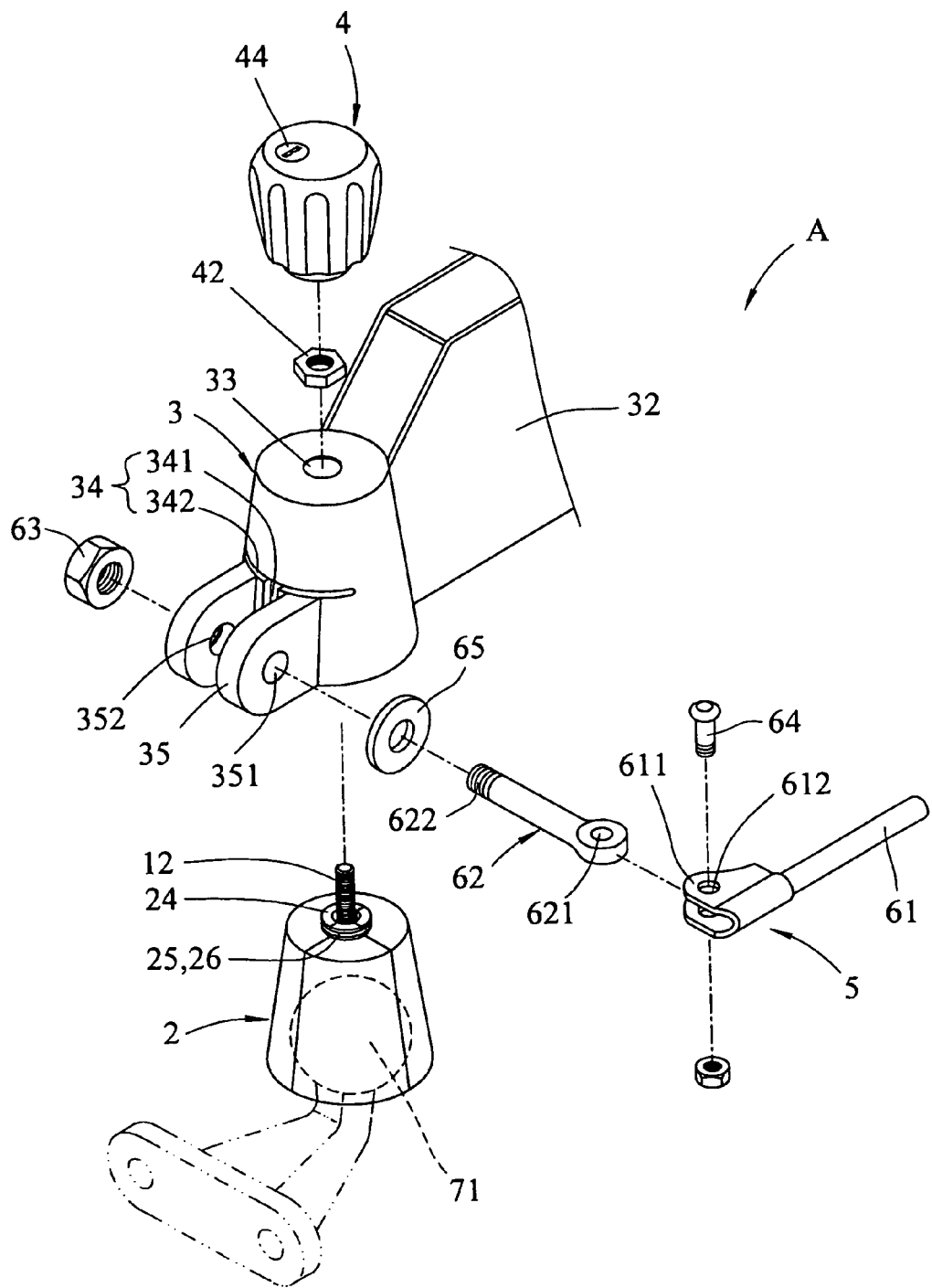
FIG. 3 is an exploded view to show the quick release unit cooperated with the securing device of the present invention.
Figure 4:
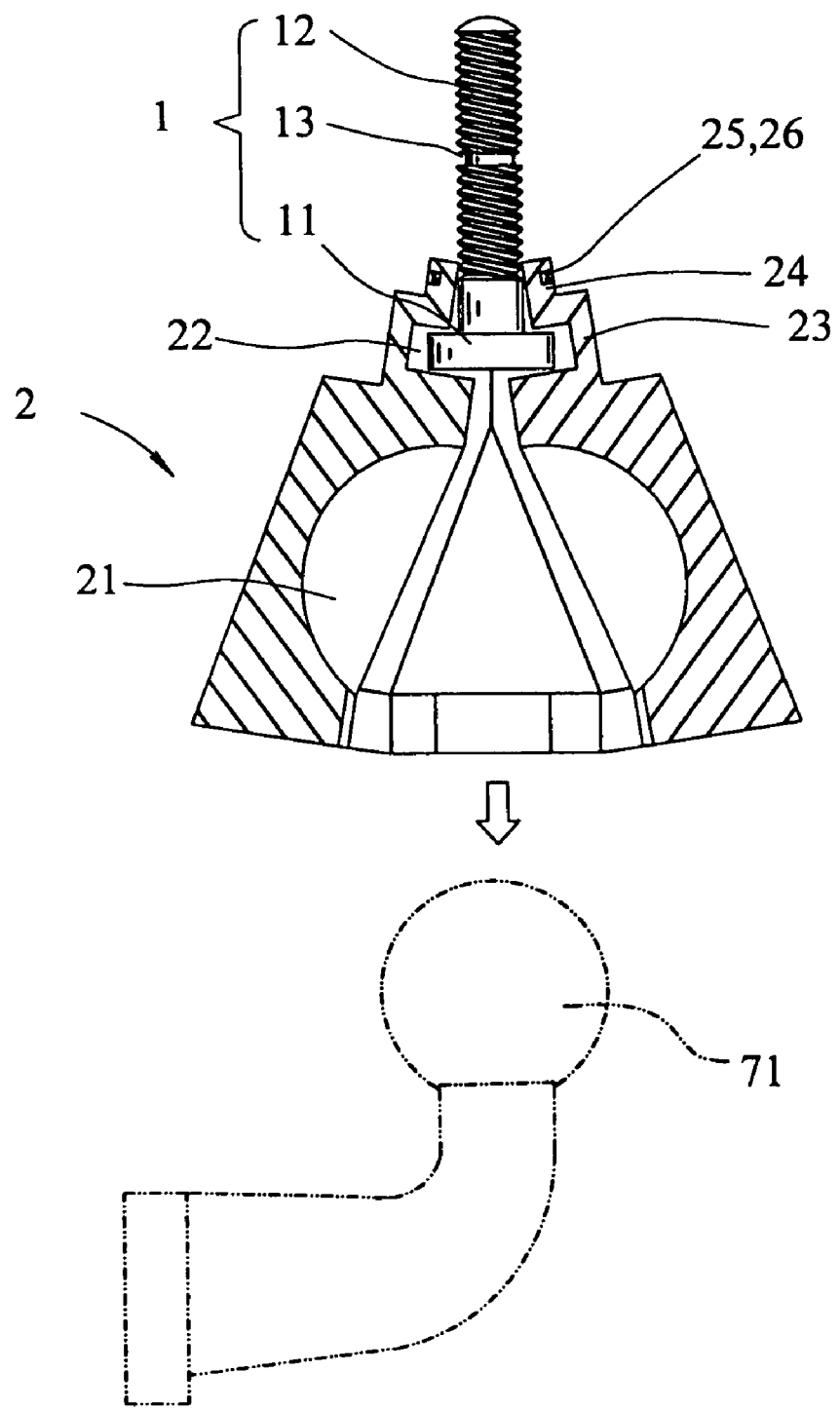
FIG. 4 is a cross sectional view to show that the sphere of the connection member is to be received in the clamping unit.
Figure 5:
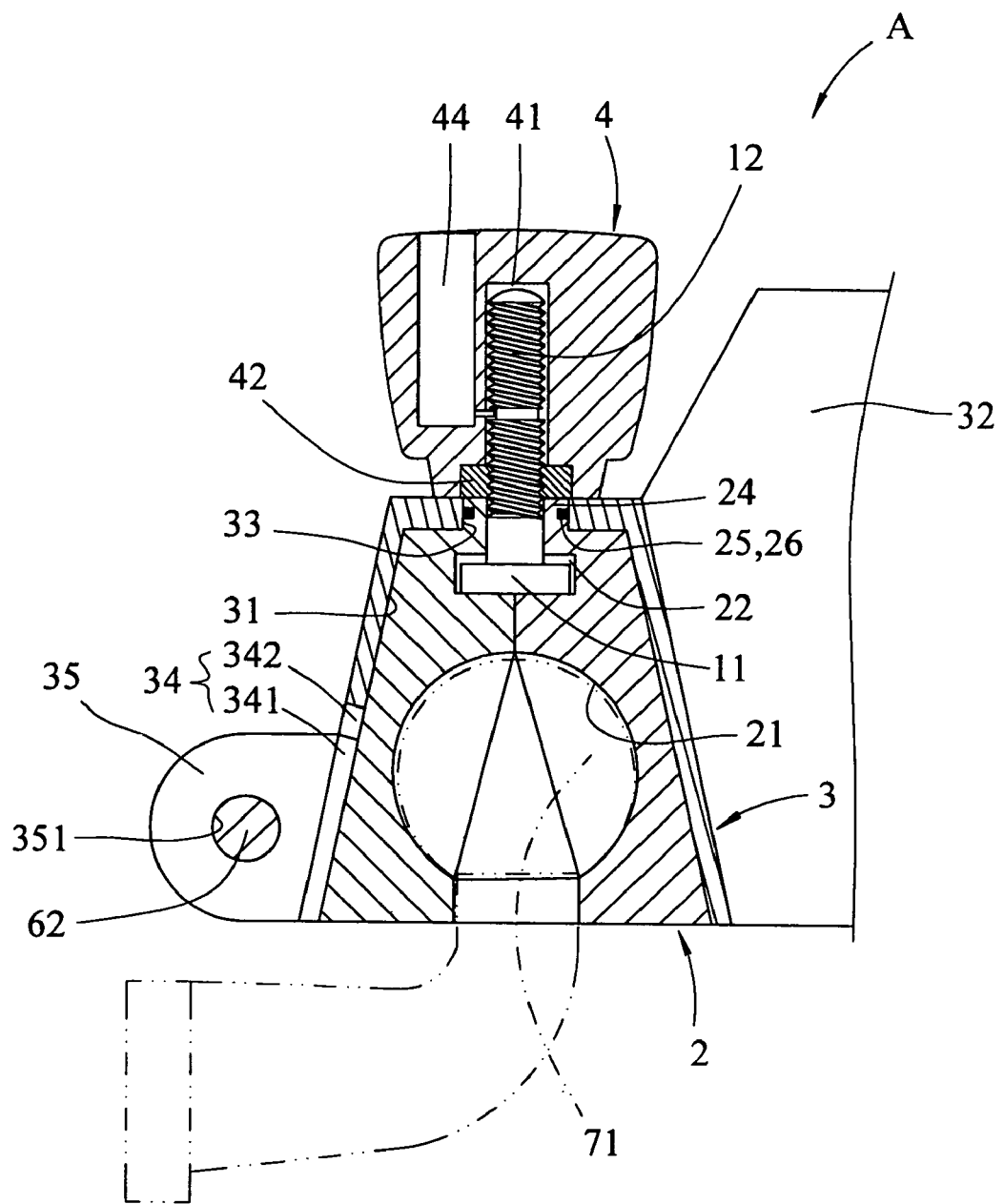
FIG. 5 is a cross sectional view to show the sphere of the connection member is clamped by the clamping unit and the knob is threadedly connected to the shank, a lock is used to lock the knob to the mounting member.

Referring to FIGS. 1 to 5 and 11, the securing device "A" for connecting a bicycle rack 72 to a connection member 71 on a vehicle 73 comprises a bolt 1 having a head 11 and a shank 12, wherein the shank 12 is a threaded shank and includes a groove 13 defined in an outer periphery thereof.

Figure 7A:
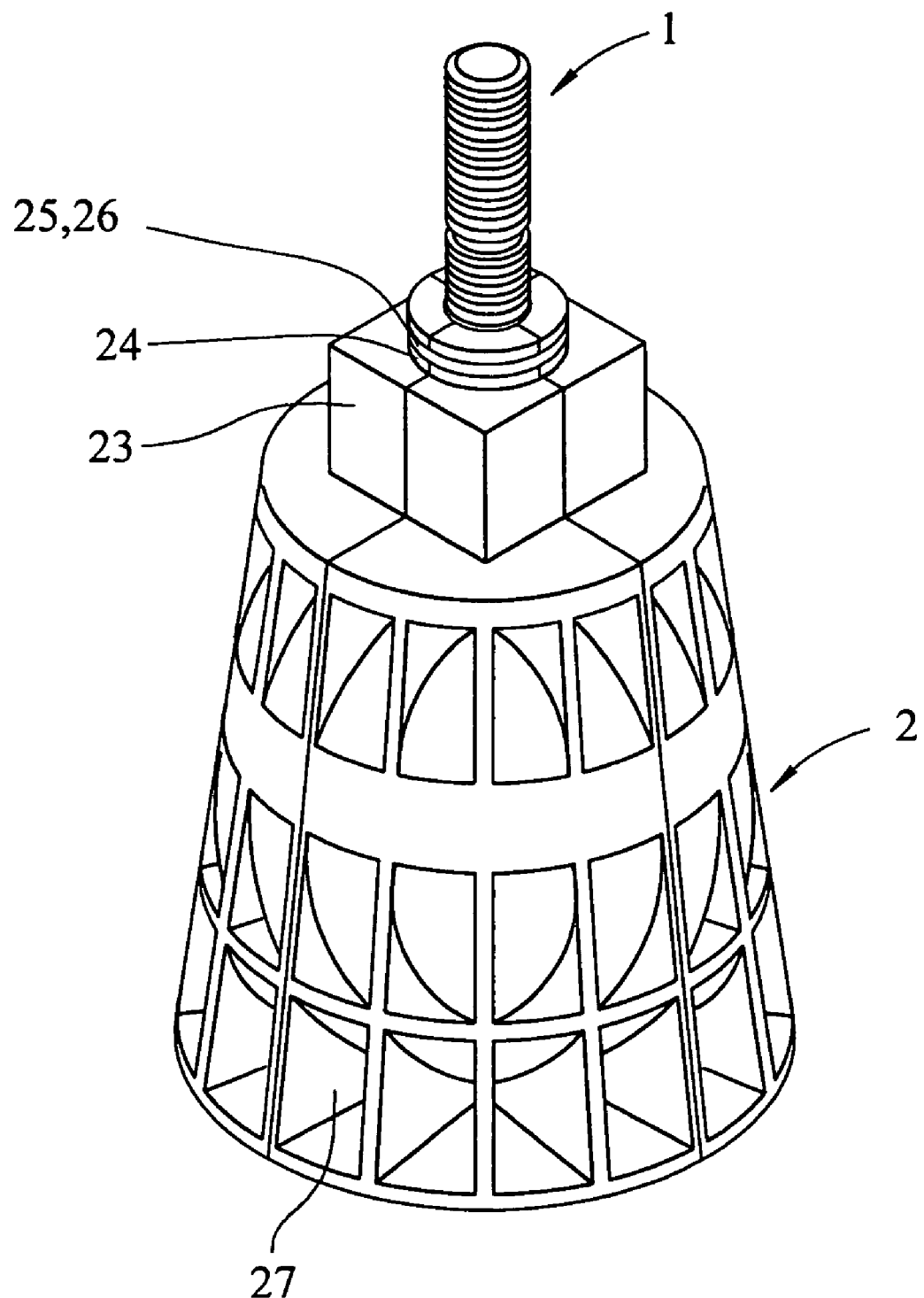
FIG. 7A shows that the four quarters include recesses so as to reduce their weight.
Figure 7B:
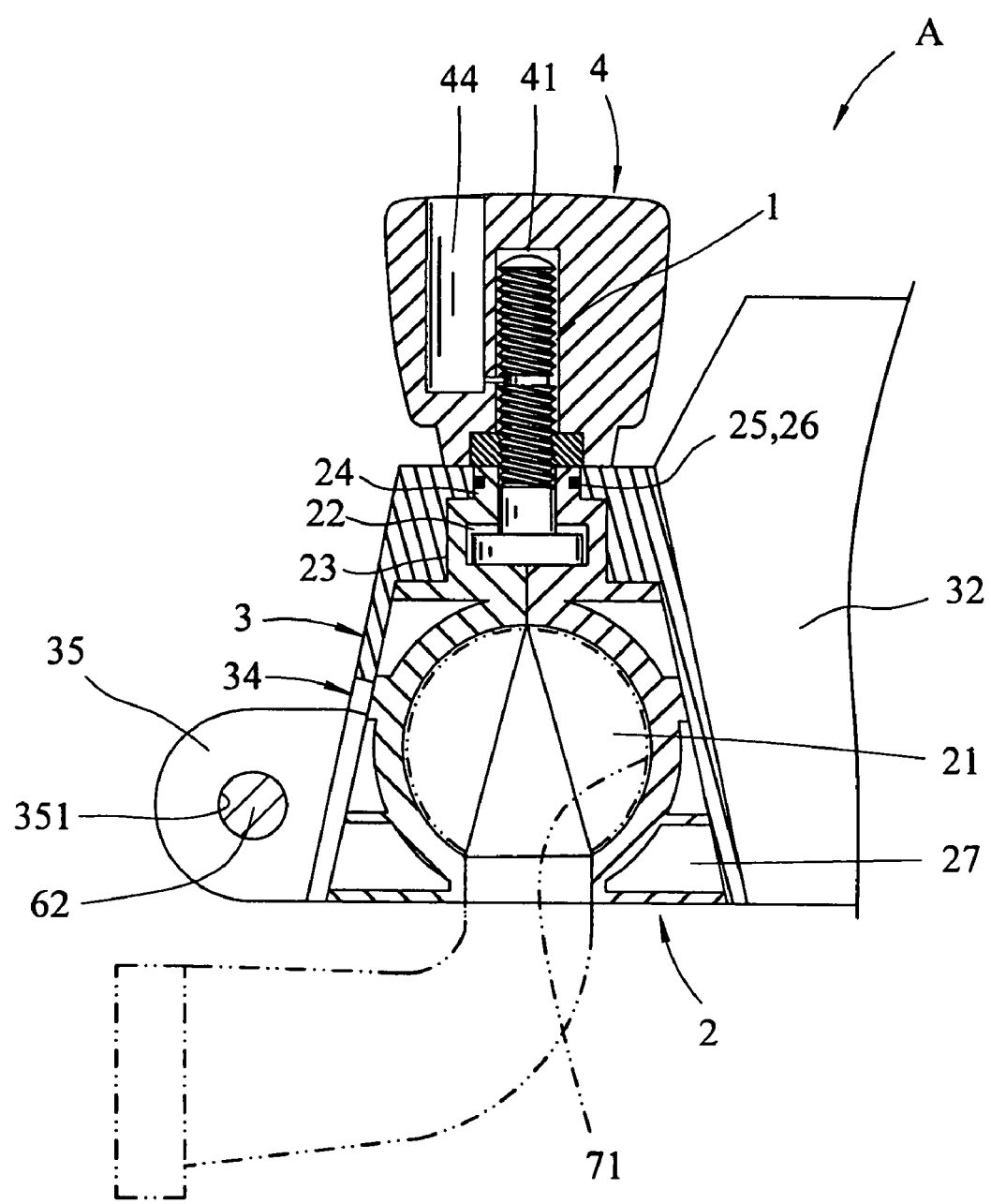
FIG. 7B is a cross sectional view to show that the connection member is clamped by the clamping unit and the quick release unit is used to clamp the two lugs on the mounting member.
Figure 8:
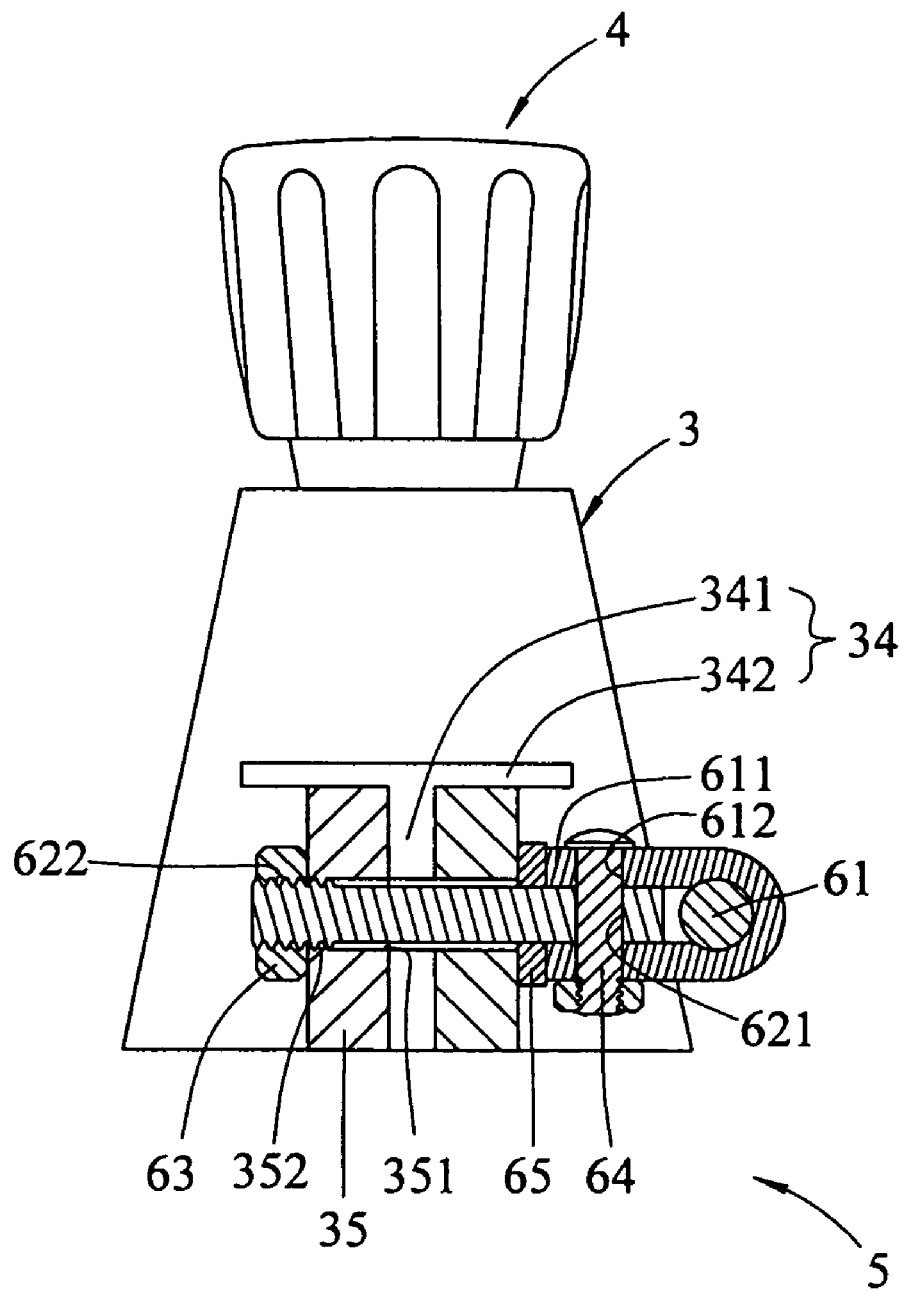
FIG. 8 is a partial cross sectional view to show the quick release unit.
Figure 9:
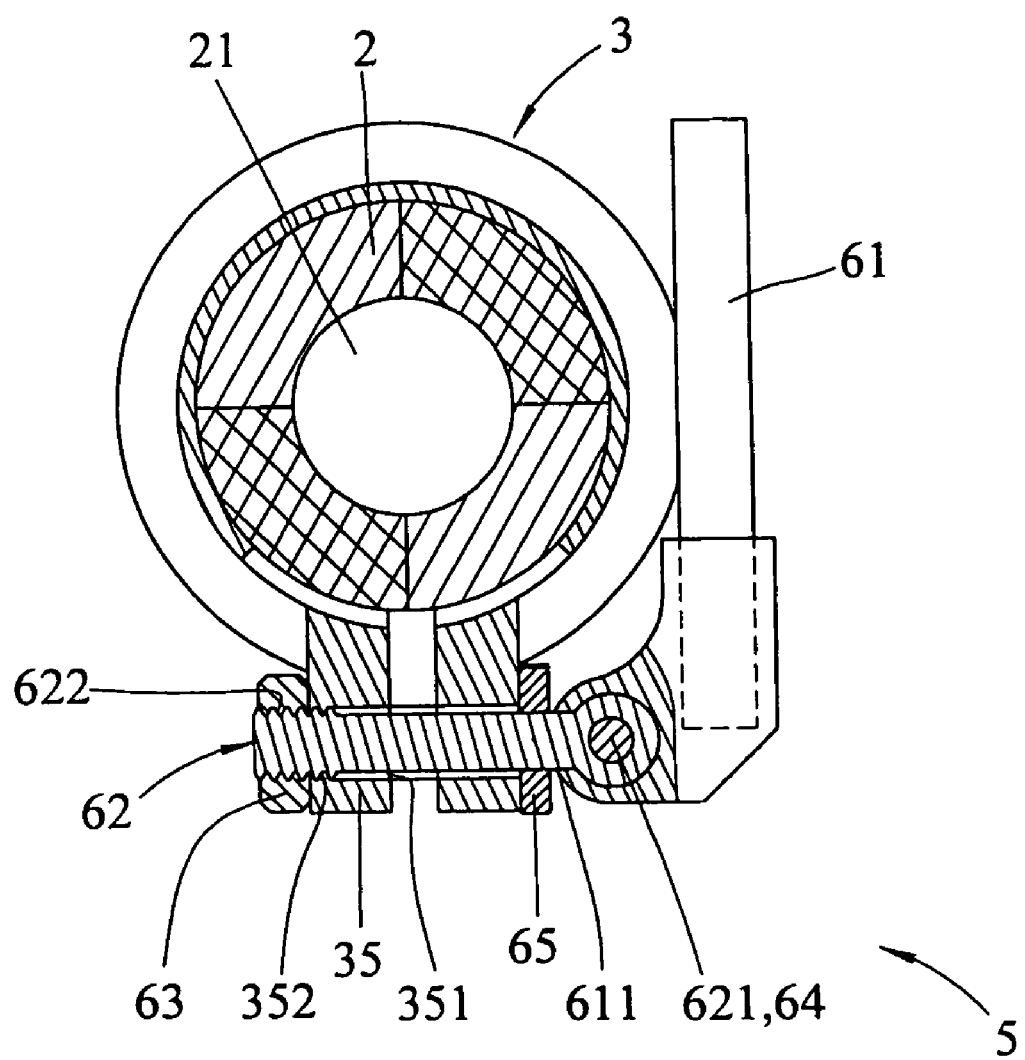
FIG. 9 is a partial cross sectional view to show the quick release unit is in tightened status.

A clamping unit 2 is composed of four quarters and each quarter has a protrusion 23 extending from a top thereof. A recessed space 21 is defined in an inner side thereof so as to form a room to accommodate the connection member 71 such as a sphere as shown. A notch 22 is defined in an inner side of each of the protrusion 23 and the head 11 of the bolt 1 is received in a space composed of the four notches 22 of the four quarters. The shank 12 extends through the top of the clamping unit 2. The protrusion 23 of each of the four quarters includes a part 24 extending from a top thereof and a groove 25 is defined in an outside of each part 24. A resilient ring 26 is securely engaged with the grooves 25 of the four parts 24 on the protrusions 23 such that the clamping unit 3 can be opened at their bottom to accommodate the connection member 71. As shown in FIG. 7A, a plurality of recesses 27 are defined in an outer periphery of each of the quarters such that the weight of the clamping unit 3 can be reduced.

A mounting member 3 is mounted to the clamping unit 2 and has a tapered inner periphery which matches with the outer periphery of the four quarters. A through hole 33 is defined through a top of the mounting member 3 and the shank 12 of the bolt 1 extends through the through hole 33. A nut 42 is threadedly connected to the shank 12. An extension 32 is connected to the mounting member 3 and connected with the bicycle rack 72.

Figure 6:
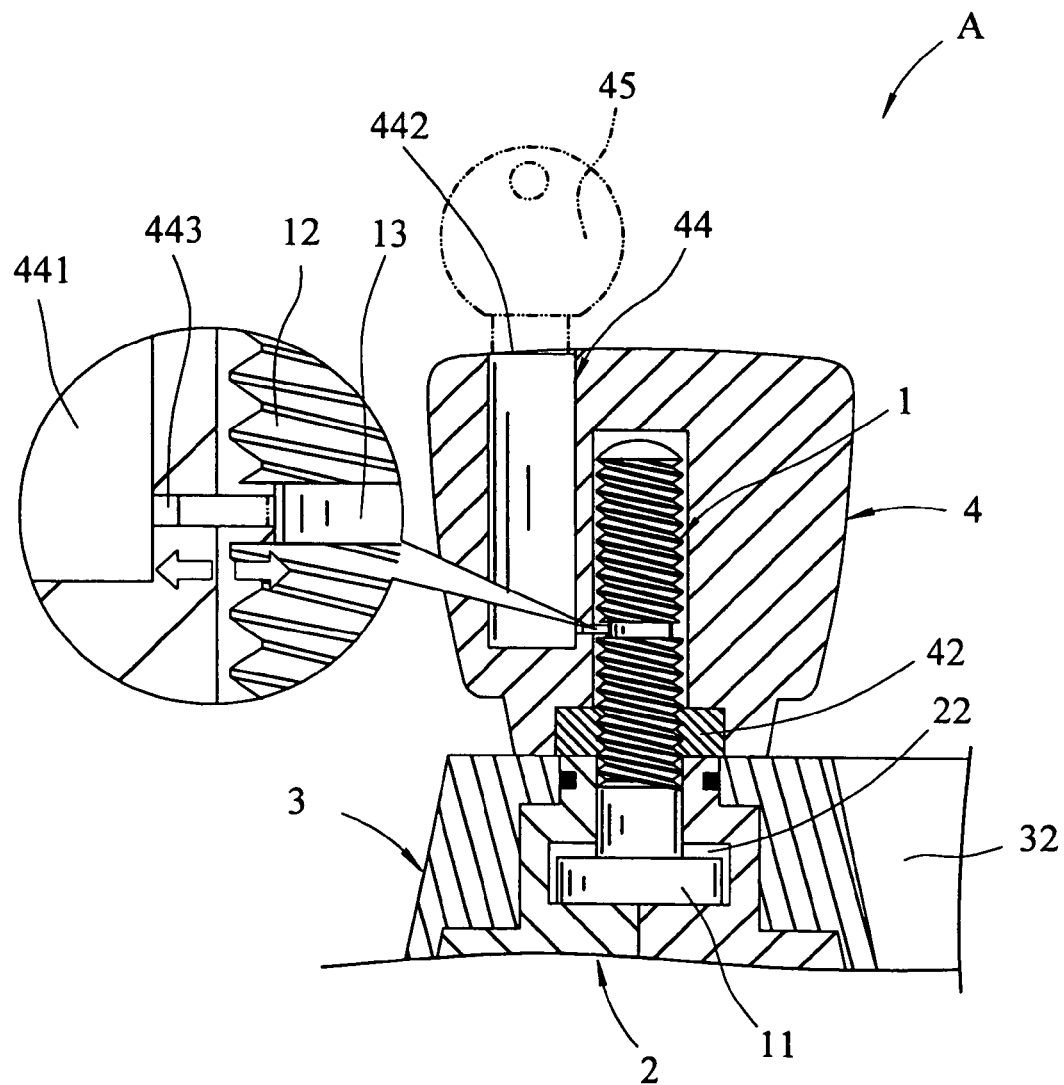
FIG. 6 is a cross sectional view to show that the tongue of the lock is engaged with the groove in the shank of the bolt.

A knob 4 has an inner threaded recess 41 which is threadedly connected to the shank 12 and presses on the top of the mounting member 3. The nut 42 is accommodated by a lower end of the knob 4. A lock 44 is located in the knob 4 and cooperated with the shank 12 of the bolt 1. As shown in FIG. 6, the lock 44 includes a body 441 and a tongue 443 extending from a body 441 of the lock 44, the tongue 443 is removably engaged with the groove 13 of the shank 12 of the bolt 1. The lock 44 includes a keyhole 442 into which a key 45 can be inserted to operate the lock 44 to remove the tongue 443 relative to the groove 13 of the shank 12.

The mounting member 3 includes a T-shaped slot 34 defined therethrough which includes a vertical slot 341 and a horizontal slot 342. The vertical slot 341 communicates with the lower end of the mounting member 3. Two lugs 35 extend radially from the mounting member 3 and the vertical slot 341 is located between the two lugs 35. The two lugs 35 include two holes 351, 352 respectively. A quick release unit 5 controls the distance between the two lugs 35 so as to clamp the four quarters by the mounting member 3.

Referring to FIGS. 7B, 8, 9, 10A, 10B and 10C, the quick release unit 5 includes a lever 61 and a cam piece 611 is connected to an end of the lever 61. A rod 62 has a hole 621 defined through a first end thereof which is pivotably and eccentrically connected to the cam piece 611 by extending a bolt 64 through the two respective holes 612 in the cam piece 611 and the hole 621 of the rod 62 and is connected with a nut. A second end of the rod 62 is a threaded section 622 which extends through the two holes 351, 352 of the two lugs 35 and is connected with a nut 63.

Figure 10A:
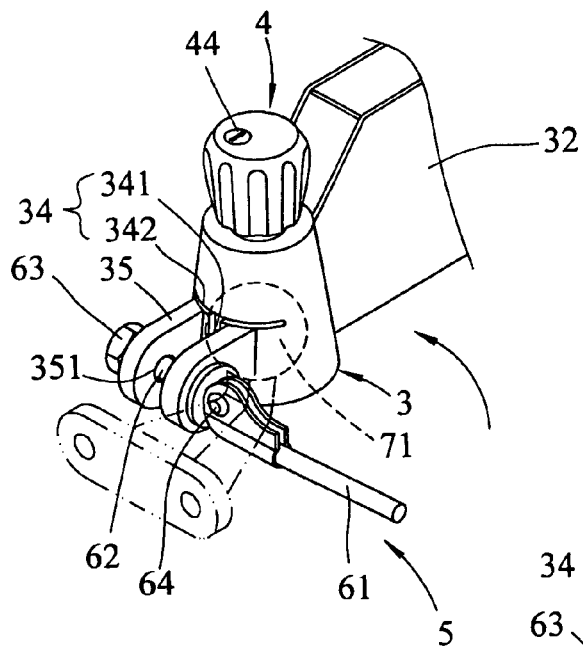
FIG. 10A shows that the quick release unit is in loosened status and the lever is pivoted downward.
Figure 10B:
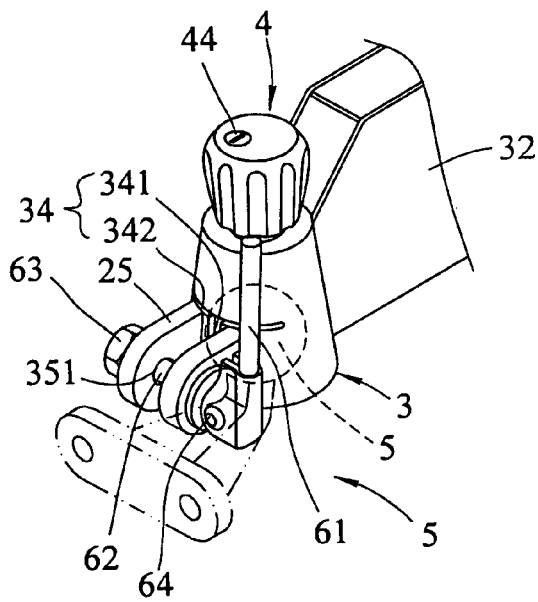
FIG. 10B shows that the quick release unit is in tightened status and the lever is pivoted upward.
Figure 10C:
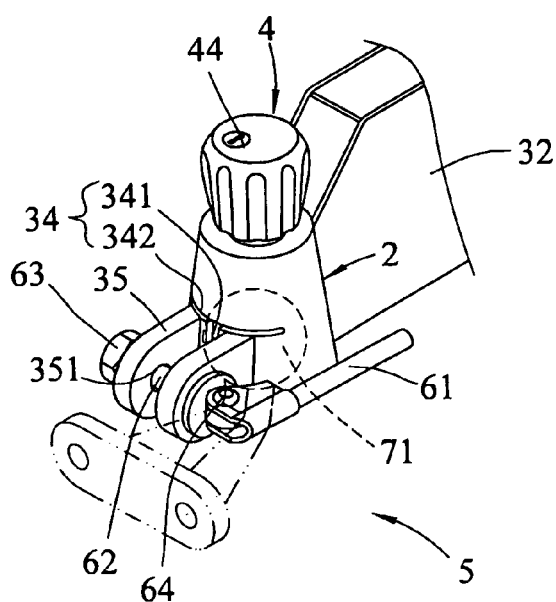
FIG. 10C shows that the quick release unit is in tightened status and the lever is pivoted to another angle.
Figure 11:
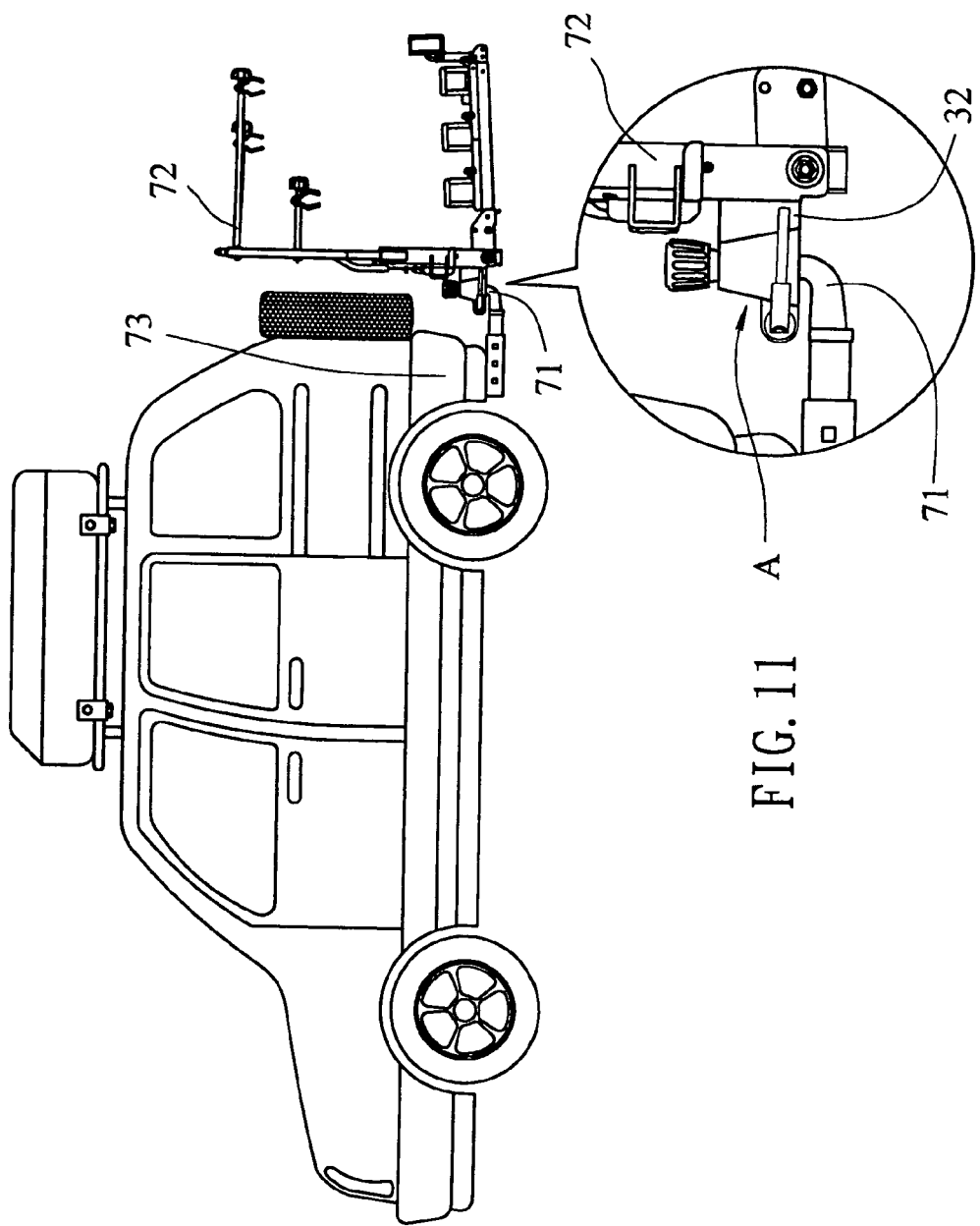
FIG. 11 shows that the securing device connects the bicycle rack to a vehicle.
Figure 12A:
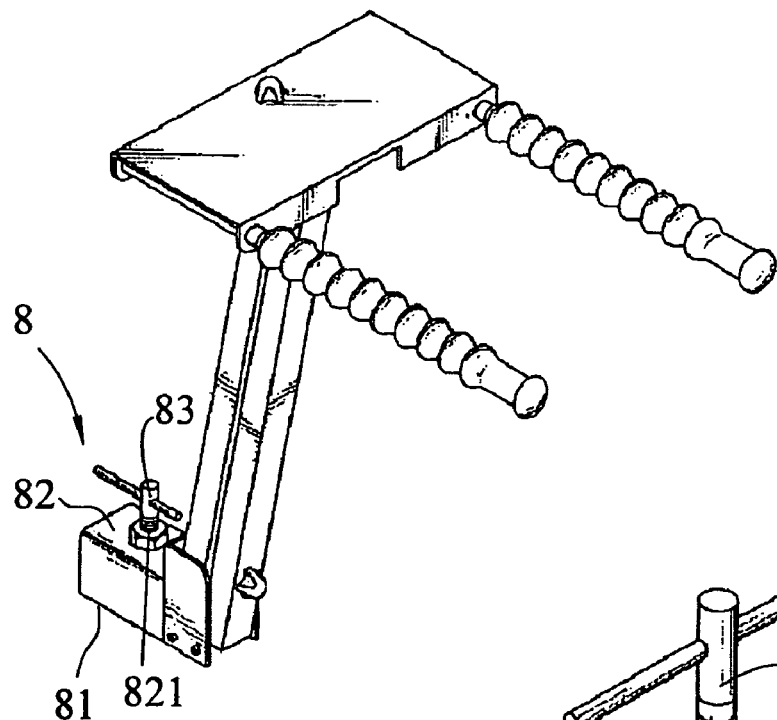
FIG. 12A is a perspective view to show a conventional connection device of a bicycle rack.
Figure 12B:
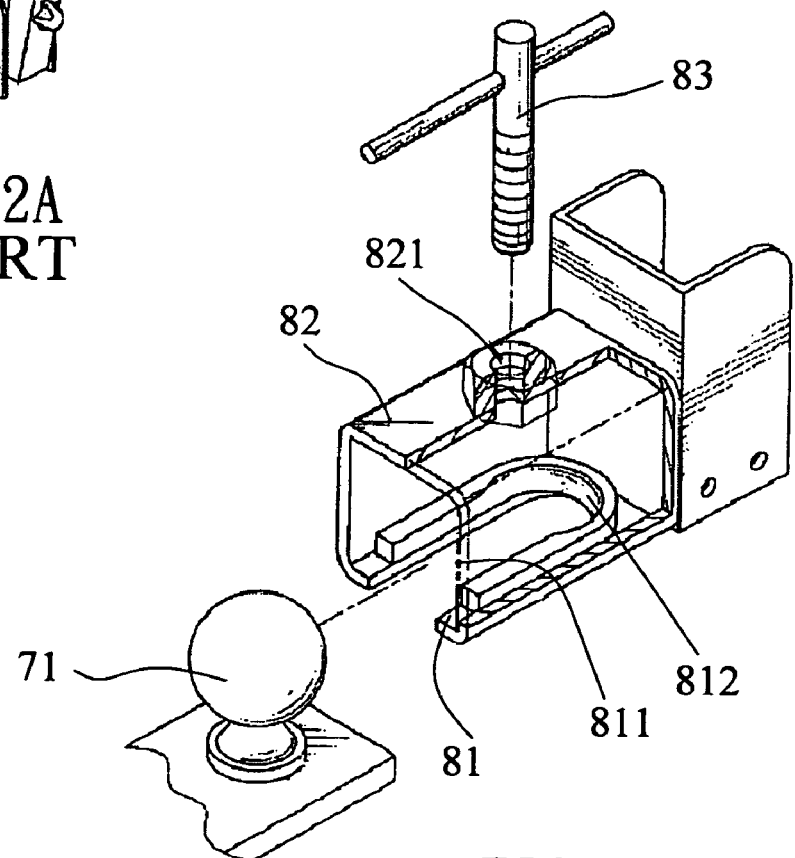
FIG. 12B is a partial cross sectional view to show the conventional connection device.

When positioning the lever 61 at horizontal position as shown in FIG. 10A, the rod 62 is not pulled by the cam piece 611 so that the distance between the two lugs 35 is wider so that the mounting member 3 and the clamping unit 2 can be easily removed from the connection member 71. When positioning the lever 61 at vertical position as shown in FIG. 10B, the rod 62 is pulled by the cam piece 611 and the distance between the two lugs 35 is narrower so that the mounting member 3 and the clamping unit 2 are securely clamp the connection member 71. FIG. 10C shows that the lever 61 can be pivoted to a desired position.

The lock 44 ensures that the bicycle rack 72 cannot be separated from the connection member 71 without using the key 45. The quick release unit 5 allows the user can easily and quickly separate the clamping unit 2 from the connection member 71.

While we have shown and described the embodiment in accordance with the present invention, it should be clear to those skilled in the art that further embodiments may be made without departing from the scope of the present invention.

What is claimed is:

1. A securing device (A) for connecting a bicycle rack (72) to a connection member (71) on a vehicle, the securing device (A) comprising:
a bolt (1) having a head (11) and a shank (12);
a clamping unit (2) composed of four quarters and each quarter having a protrusion (23) extending from a top thereof and a recessed space (21) defined in an inner side thereof, a notch (22) defined in an inner side of each of the protrusion (23), a room formed by the recessed spaces (21) of the four quarters adapted to accommodate the connection member (71), the head of the bolt (1) received in a space composed of the four notches (22) of the four quarters and the shank (12) extending through the top of the clamping unit (2);
a mounting member (3) mounted to the clamping unit (2) and having a through hole (33) defined through a top thereof, the shank (12) of the bolt (1) extending through the through hole (33), an extension (32) connected to the mounting member (3) and adapted to be connected with the bicycle rack (72), a nut (42) threadedly connected to the shank (12), and
a knob (4) having an inner threaded recess (41) which is threadedly connected to the shank (12) and pressing on the top of the mounting member (3), a lock (44) located in the knob (4) and cooperated with the shank (12) of the bolt (1).

2. The device as claimed in claim 1, wherein the shank (12) of the bolt (1) includes a groove (13) defined in an outer periphery thereof and the lock (44) includes a tongue (443) extending from a body (441) of the lock (44), the tongue (443) is removably engaged with the groove (13).

3. The device as claimed in claim 1, wherein the nut (42) is accommodated by a lower end of the knob (4).

4. The device as claimed in claim 1, wherein the protrusion (23) of each of the four quarters includes a part (24) extending from a top thereof and a groove (25) is defined in an outside of each part (24), a resilient ring (26) is securely engaged with the grooves (25) of the four parts (24) on the protrusions (23).

5. The device as claimed in claim 1, wherein a plurality of recesses (27) are defined in an outer periphery of each of the quarters.

6. The device as claimed in claim 1, wherein the mounting member (3) includes a T-shaped slot (34) defined therethrough which includes a vertical slot (341) and a horizontal slot (342), the vertical slot (341) communicates with the lower end of the mounting member (3), two lugs (35) extend radially from the mounting member (3) and the vertical slot (341) is located between the two lugs (35), the two lugs (35) include two holes (351, 352) respectively, a quick release unit (5) controls the distance between the two lugs (35) so as to clamp the four quarters by the mounting member (3).

7. The device as claimed in claim 6, wherein the quick release unit (5) includes a lever (61) and a cam piece (611) is connected to an end of the lever (61), a rod (62) has a first end pivotably and eccentrically connected to the cam piece (611), a second end of the rod (62) extends through the two holes (351, 352) of the two lugs (35) and is connected with a nut (63).

* * * * *